(12) United States Patent
Myouga

(10) Patent No.: US 10,579,130 B2
(45) Date of Patent: *Mar. 3, 2020

(54) STORAGE DEVICE HAVING A SERIAL COMMUNICATION PORT

(71) Applicant: Toshiba Memory Corporation, Tokyo (JP)

(72) Inventor: Nobuyuki Myouga, Iruma Saitama (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/352,245

(22) Filed: Mar. 13, 2019

(65) Prior Publication Data

US 2019/0212806 A1 Jul. 11, 2019

Related U.S. Application Data

(63) Continuation of application No. 15/057,026, filed on Feb. 29, 2016, now Pat. No. 10,268,258.

(60) Provisional application No. 62/192,268, filed on Jul. 14, 2015.

(51) Int. Cl.
*G06F 1/3287* (2019.01)
*G06F 13/42* (2006.01)
*G06F 1/3234* (2019.01)

(52) U.S. Cl.
CPC .......... *G06F 1/3287* (2013.01); *G06F 1/3268* (2013.01); *G06F 13/4295* (2013.01); *Y02D 10/151* (2018.01); *Y02D 10/154* (2018.01); *Y02D 10/171* (2018.01)

(58) Field of Classification Search
CPC .......................... G06F 13/4295; G06F 1/3287
See application file for complete search history.

(56) References Cited

U.S. PATENT DOCUMENTS

| 7,206,951 | B2 | 4/2007 | Ishibashi et al. |
| 7,424,628 | B2 | 9/2008 | Matsumoto et al. |
| 10,268,258 | B2* | 4/2019 | Myouga ............... G06F 1/3287 |
| 2004/0151149 | A1 | 8/2004 | Song et al. |
| 2010/0005327 | A1 | 1/2010 | Murata |
| 2012/0166829 | A1 | 6/2012 | Jinno et al. |
| 2014/0040544 | A1 | 2/2014 | Ritter et al. |
| 2014/0040648 | A1 | 2/2014 | Miller et al. |
| 2014/0129855 | A1* | 5/2014 | Hamdi ................... G06F 1/266 |
| | | | 713/320 |

FOREIGN PATENT DOCUMENTS

| JP | 2000010907 A | 1/2000 |
| JP | 2013178675 A | 9/2013 |

* cited by examiner

*Primary Examiner* — Zachary K Huson
(74) *Attorney, Agent, or Firm* — Kim & Stewart LLP

(57) ABSTRACT

A storage device includes a storage unit, a communication port configured to perform serial communication with an external device, and a controller configured to access the storage unit based on a command communicated from the external device through the communication port, and set the communication port to a power-saving mode before the communication port receives any signal for synchronization.

19 Claims, 9 Drawing Sheets

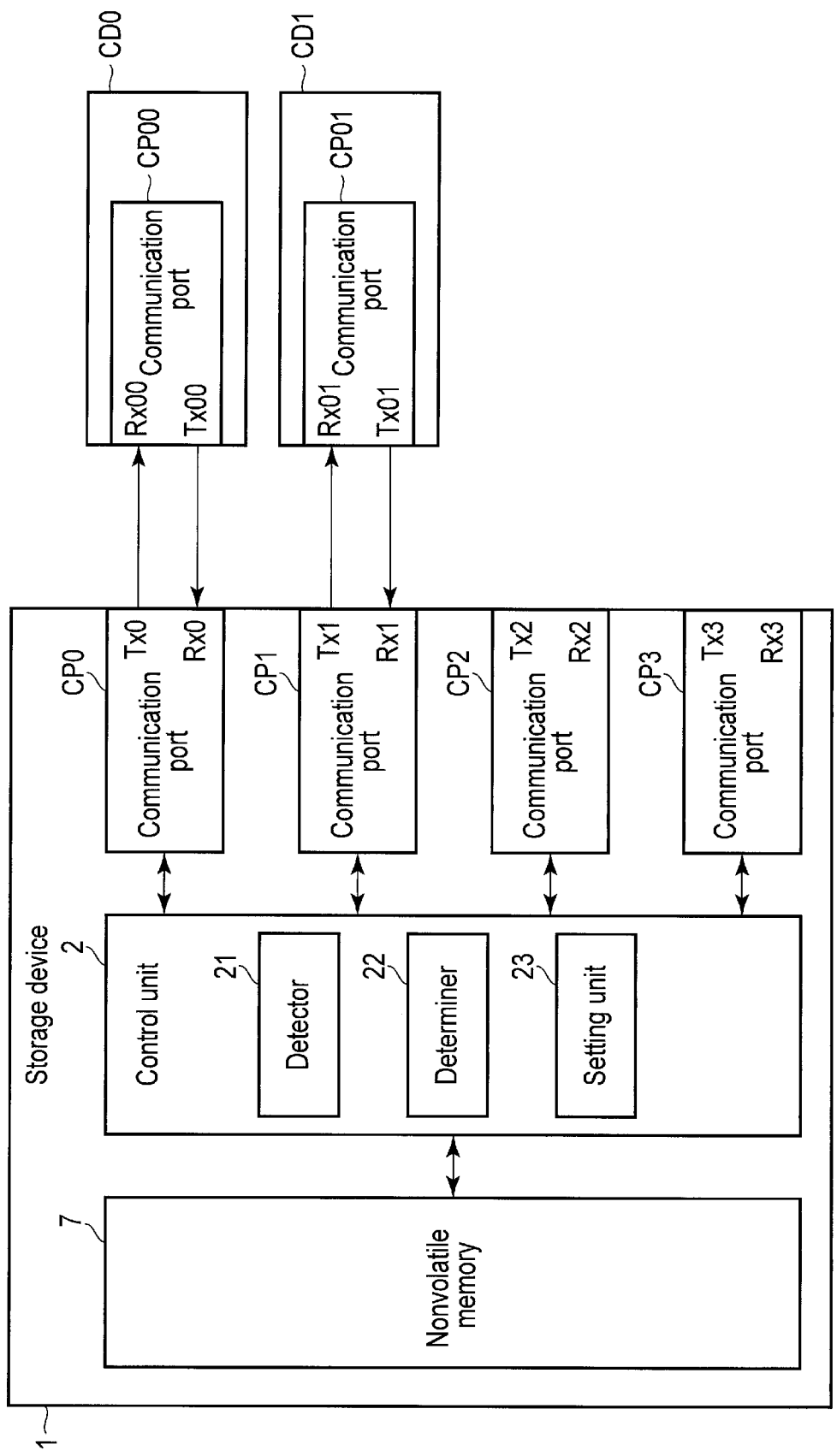
F I G. 1

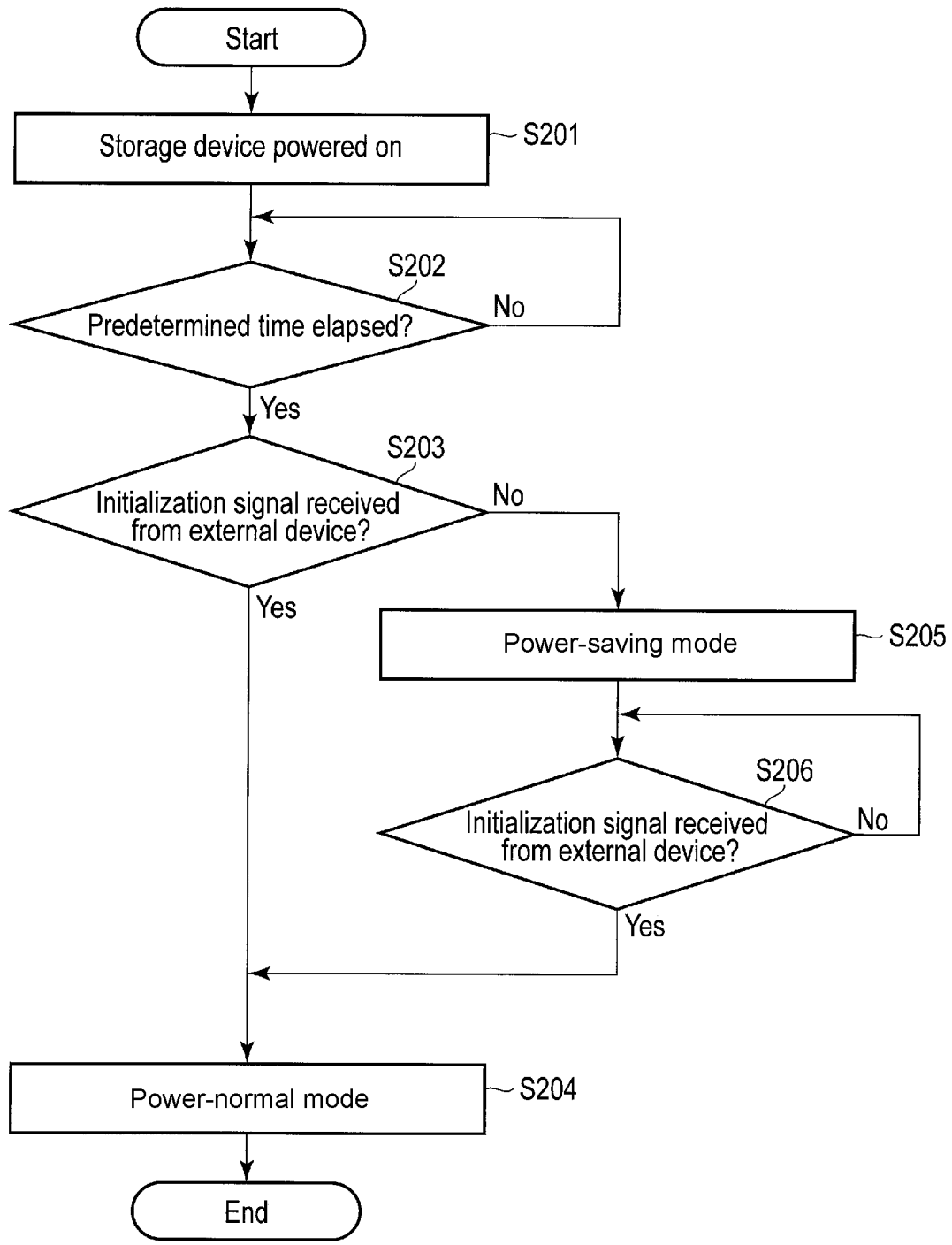
F I G. 2

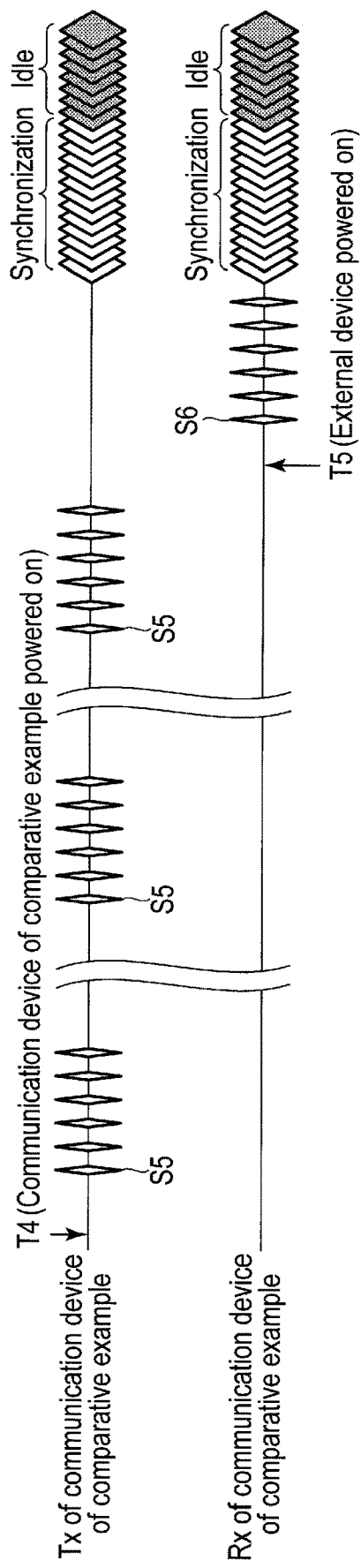
F I G. 5

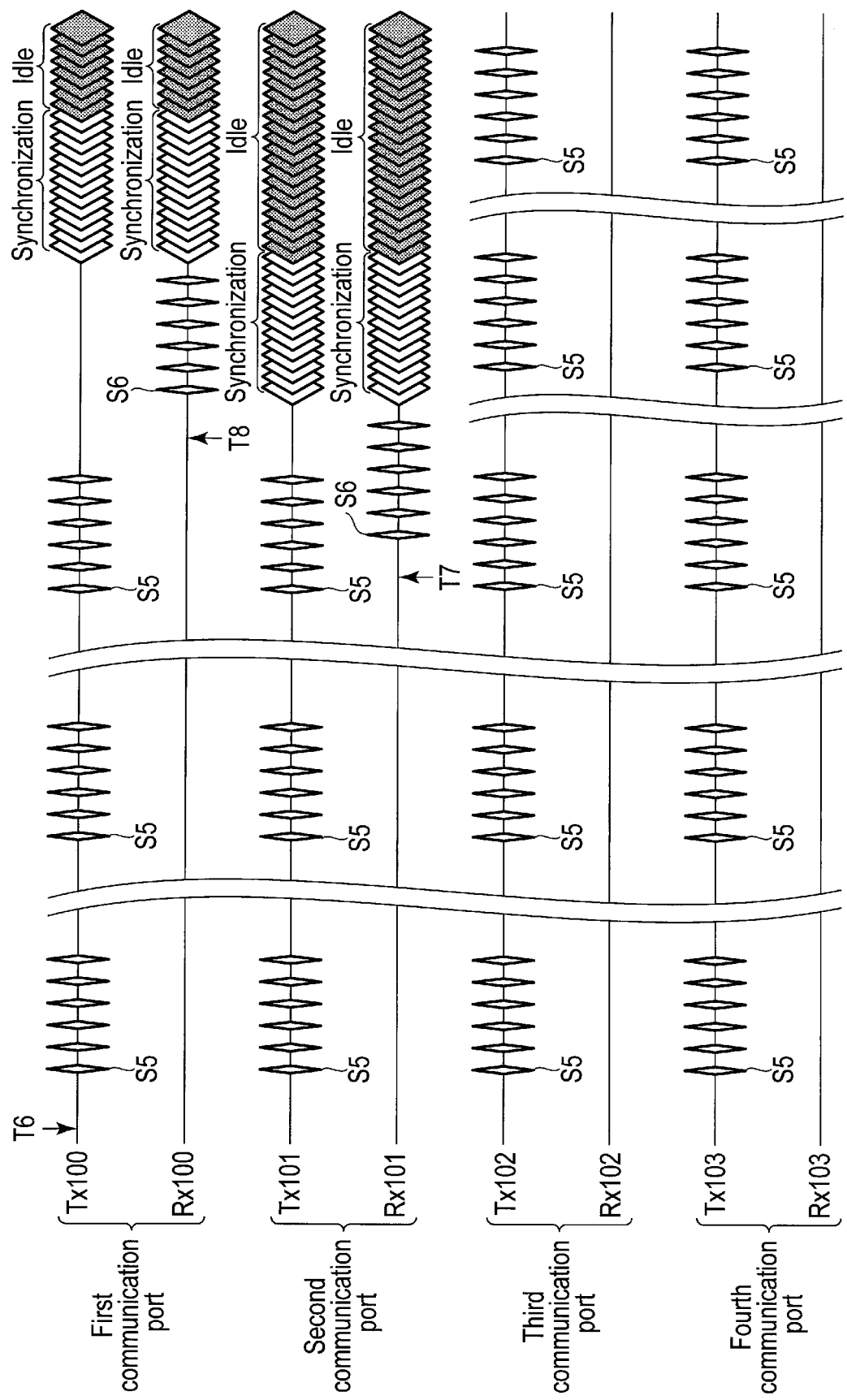
F I G. 6

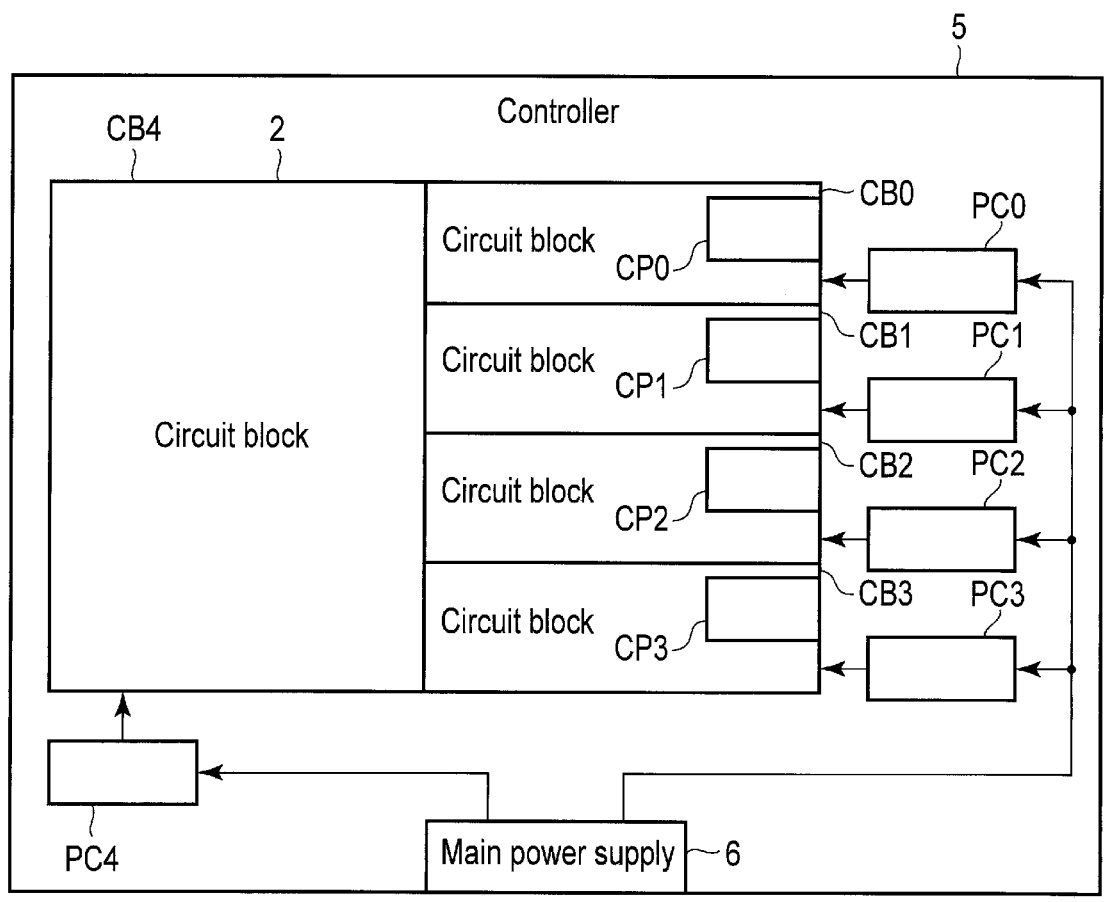
F I G. 7

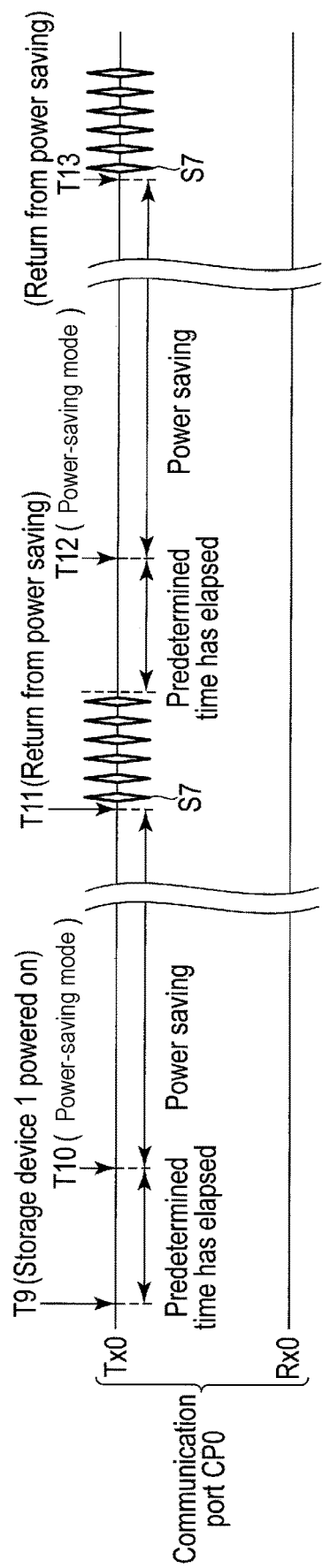
F I G. 9

STORAGE DEVICE HAVING A SERIAL COMMUNICATION PORT

CROSS-REFERENCE TO RELATED APPLICATIONS

This application is a continuation of U.S. patent application Ser. No. 15/057,026, filed on Feb. 29, 2016, which is based upon and claims the benefit of priority from Provisional Application No. 62/192,268, filed on Jul. 14, 2015, the entire contents of each of which are incorporated herein by reference.

FIELD

Embodiments described here relate generally to a storage device having a serial communication port.

BACKGROUND

A communication device of one type has a communication port that performs serial communication with an external device connected thereto, for example, a host computer. The communication device and the external device communicate with each other by a serial communication method. The communication device executes a command received from the external device, transmits data to the external device, and receives data from the external device.

BRIEF DESCRIPTION OF THE DRAWINGS

FIG. 1 is a block diagram of a storage device according to a first embodiment.

FIG. 2 is a flowchart illustrating processing of the storage device according to the first embodiment.

FIG. 5 is a timing chart illustrating a second operation of the communication device according to the comparative example.

FIG. 6 is a timing chart illustrating an operation of a communication device of another comparative example including a plurality of communication ports.

FIG. 7 is a block diagram of a storage device according to a second embodiment.

FIG. 9 is a timing chart illustrating an operation of the storage device according to the third embodiment.

DETAILED DESCRIPTION

Figure 3:
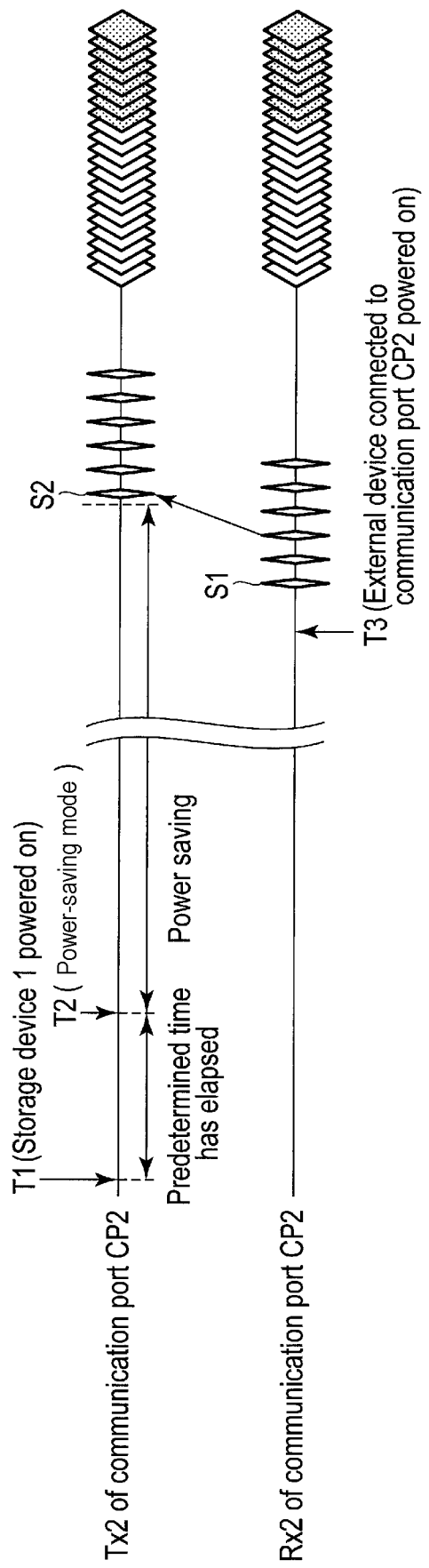
FIG. 3 is a timing chart illustrating an operation of the storage device according to the first embodiment.

In general, according to an embodiment, a storage device includes a storage unit, a communication port configured to perform serial communication with an external device, and a controller configured to access the storage unit based on a command communicated from the external device through the communication port, and set the communication port to a power-saving mode before the communication port receives any signal for synchronization.

Embodiments will be described hereinafter with reference to the accompanying drawings. In the following description, substantially the same functions or structural elements are described with the same numbers, and overlapping description will be provided only when necessary.

First Embodiment

In a first embodiment, a storage device having a serial communication function will be described. The storage device according to the present embodiment sets a communication port in a power-saving state (mode) before executing communication for synchronization with an external device in a state in which the communication port is connected to the external device for communication. Moreover, if the communication port is in a power-saving state and receives a specific signal from the external device, the storage device causes the communication port to transition to a power-normal state (non-power-saving state or non-power-saving mode) and executes communication for synchronization with the external device. As a result, power consumption of the storage device can be reduced.

In the present embodiment, communication and processing for synchronization with an external device will be referred to as an initialization sequence.

FIG. 1 is a block diagram of the storage device according to the present embodiment.

The storage device 1 includes communication ports CP0 to CP3, a control unit (controller) 2, and nonvolatile memory 7. In the present embodiment, it is assumed that the storage device 1 includes the four communication ports CP0 to CP3. However, the number of communication ports in the storage device 1 may be one, and may be two or more.

To each of the communication ports CP0 to CP3, an external device can be connected for communication with the external device. The external device is, for example, a device such as an information processing device or a communication device connected (e.g., a host and an expander) to the storage device 1 for communication. In FIG. 1, an external device CD0 is connected to the communication port CP0, and an external device CD1 is connected to the communication port CP1. However, the connection relationship between the storage device 1 and the external devices can be freely changed.

The communication port CP0 includes a transmission line Tx0 and a reception line Rx0. The communication port CP1 includes a transmission line Tx1 and a reception line Rx1. The communication port CP2 includes a transmission line Tx2 and a reception line Rx2. The communication port CP3 includes a transmission line Tx3 and a reception line Rx3.

The external devices CD0 and CD1 include communication ports CP00 and CP01, respectively. The communication port CP00 includes a transmission line Tx00 and a reception line Rx00. The communication port CP01 includes a transmission line Tx01 and a reception line Rx01.

The communication function of the storage device 1 and the communication functions of the external devices CD0 and CD1 may be the same. In the present embodiment, the storage device 1 will be described representatively.

The storage device 1 executes serial communication with the external devices CD0 and CD1. In the present embodiment, Serial ATA (SATA) or Serial Attached SCSI (SAS) is used as a serial communication protocol. Alternatively, serial communication protocols other than SATA and SAS may also be used.

The communication ports CP0 to CP3 of the storage device 1 are terminals of software or hardware for communicating data with communication ports of external devices, and correspond to interfaces. In SATA or SAS, a communication port is referred to as a phy.

The reception line Rx0 and the transmission line Tx0 of the communication port CP0 can be connected to the transmission line Tx00 for reception of data and the reception line Rx00 for transmission of data, respectively. A pair of the transmission line Tx0 and the reception line Rx0 corresponds to a communication channel. That is, the communication port CP0 is connected to the communication port CP00 of the external device CD0 through the communication channel, and communication is executed between the communication port CP0 of the storage device 1 and the communication port CP00 of the external device CD0.

Because the communication ports CP1 to CP3 are the same as the communication port CP0, description thereof is omitted.

The control unit 2 includes a detector 21, a determiner 22, and a setting unit 23. In the present embodiment, the control unit 2 sets the communication ports CP0 to CP3 in a power-saving state before executing communication for synchronization with the external devices in a state in which the communication ports CP0 to CP3 are connected to the external devices for communication with the external devices. If the communication ports CP1 to CP3 are in a power-saving state and receives specific signals from the external devices, the control unit 2 causes the communication ports CP1 to CP3 to transition from the power-saving state to a power-normal state and executes communication for synchronization with the external devices.

Thus, in the case of being asynchronous with the external devices, the control unit 2 can cause the communication ports CP0 to CP3 to transition from the power-normal state to the power-saving state without executing an initialization sequence of communication channels. If the external devices CD0 and CD1 are connected and specific signals are received from the communication channels, the control unit 2 causes the communication ports CP0 and CP1 corresponding to the external devices CD0 and CD1 to transition from the power-saving state to the power-normal state, and executes the initialization sequence for synchronization with the external devices.

In the present embodiment, a specific signal may be, for example, an initialization signal and a return request signal. For example, if the communication protocol is SAS, an initialization signal may be referred to as COMINIT. If the communication protocol is SATA, an initialization signal transmitted from a host device may be referred to as COM-RESET, and an initialization signal transmitted from a storage device connected to the host device may be referred to as COMINIT. COMRESET and COMINIT in SATA are electrically the same signals. In SAS and SATA, a return request signal may be referred to as COMWAKE. COMINIT, COMRESET, and COMWAKE used in SAS and SATA, and COMSAS used in SAS are generally referred to as out-of-bounds (OOB) signals.

In the present embodiment, the power-saving state may be, for example, a partial phy power condition (partial power state) or a slumber phy power condition (slumber power state). During the partial phy power condition and the slumber phy power condition, portions of the phy are shut down to converse power. During the partial phy power condition, exit time (exit latency) can be up to 10 microseconds. During the slumber phy power condition, exit time (exit latency) can be as much as 10 milliseconds.

In the present embodiment, an initialization sequence may be, for example, a phy reset sequence.

In the present embodiment, the communication ports CP0 to CP3 may be included in the control unit 2.

The control unit 2 receives a write command, a write address, and write data from an external device through one of the communication ports CP0 to CP3. The control unit 2 converts the write address into a physical address on the basis of the write command, and writes the write data at a position corresponding to the physical address in the nonvolatile memory 7.

The control unit 2 receives a read command and a read address from an external device through any of the communication ports CP0 to CP3. The control unit 2 converts the read address into a physical address on the basis of the read command, reads read data from a position corresponding to the physical address in the nonvolatile memory 7, and transmits the read data to the external device from which the read command was issued through one of the communication ports CP0 to CP3.

The detector 21 detects a state in which the storage device 1 and an external device are out of synchronization. For example, the detector 21 detects an asynchronous state after the storage device 1 is powered on and before an initialization sequence is executed. In addition, for example, the detector 21 detects the asynchronous state before the storage device 1 synchronizes with an external device again after being synchronized with the external device and then being asynchronous with the external device.

The determiner 22 determines whether each of the communication ports CP0 to CP3 has received a communication signal for synchronization within a predetermined time since the detection of the asynchronous state.

For example, the communication signal for synchronization is an example of the above-described specific signal. Thus, as the communication signal for synchronization, an initialization signal or a return request signal may be used. The communication signal for synchronization may be, for example, a signal exchanged between a communication port and an external device in the first sequence for confirming the existence of the external device. The communication signal for synchronization may be, for example, a signal exchanged between the communication port and the external device in the second sequence for determining a communicable rate and achieving synchronization per bit. That is, as the communication signal for synchronization, at least one signal included in the above-described first and second sequences can be used.

The setting unit 23 sets a communication port which has received an initialization signal within a predetermined time to the power-normal state, and sets a communication port which has not received the initialization signal within the predetermined time to the power-saving state.

The determiner 22 determines whether or not an initialization signal or a return request signal has been received at a communication port in the power-saving state.

If an initialization signal or a return request signal has been received at a communication port in the power-saving state (for example, if a communication port in the power-saving state is connected to an external device, whereby an initialization signal or a return request signal is received from the external device), the setting unit causes the communication port which has received the initialization signal or the return request signal to transition to the power-normal state, and executes a normal initialization sequence.

In the present embodiment, the determiner 22 may determine whether or not an idle signal has been received within a predetermined time, and cause a communication port to transition from the power-normal state to the power-saving state if the idle signal has not been received within the predetermined time.

Although in the present embodiment a communication port transitions from the power-saving state to the power-normal state on the basis of a specific signal from an external device, the communication port may transition from the power-saving state to the power-normal state, for example, on the basis of a power-normal command from a processor of the storage device 1, alternatively.

The nonvolatile memory 7 may be, for example, a memory such as a NAND flash memory, a NOR flash memory, a magnetoresistive random access memory (MRAM), a phase-change random access memory (PRAM), a resistive random access memory (ReRAM), or a ferroelectric random access memory (FeRAM). In addition, the nonvolatile memory 7 may be a three-dimensional flash memory.

The storage device 1 may include a solid-state drive (SSD), a memory card, a hard disk drive (HDD), a hybrid memory device including an HDD and an SSD, an optical disk, etc.

Hereinafter, in each of the embodiments, an operation of causing a communication port to transition to the power-saving state before executing communication (initialization sequence) for synchronization with an external device after the storage device 1 is powered on will be described representatively. However, the same processing can be applied to an operation of causing a communication port to transition to the power-saving state before synchronizing with an external device again after being synchronous with the external device and then being asynchronous with the external device.

FIG. 2 is a flowchart, as an example, illustrating the processing of the storage device 1 according to the present embodiment. FIG. 2 illustrates steps through which the storage device 1 is powered on and then a communication port enters the power-normal state.

In step S201, the detector 21 detects a state that the storage device 1 is powered on.

In step S202, the determiner 22 determines whether or not a predetermined time has elapsed for each of the communication ports CP0 to CP3 since the storage device 1 was powered on. Each of the communication ports CP0 to CP3 is in a wait state until the predetermined time has elapsed since the storage device 1 was powered on.

When the predetermined time has elapsed since the storage device 1 was powered on, the determiner 22 determines whether or not each of the communication ports CP0 to CP3 has received an initialization signal of a communication channel within the predetermined time in step S203.

In step S204, the setting unit 23 sets a communication port which has received an initialization signal within the predetermined time to the power-normal state. Then, the processing ends.

In step S205, the setting unit 23 sets a communication port which has not received the initialization signal within the predetermined time to the power-saving state.

After the communication port enters the power-saving state, the determiner 22 determines whether or not an initialization signal has been received at the communication port in the power-saving state in step S206.

If the initialization signal has been received at the communication port in the power-saving state, the processing proceeds to step S204.

If the initialization signal has not been received at the communication port in the power-saving state, the processing proceeds to step S206, and enters a wait state.

FIG. 3 is a timing chart illustrating the operation of the storage device 1 according to the present embodiment. FIG. 3 illustrates the communication state of signals between the transmission line Tx2 and the reception line Rx2 of the communication port CP2.

At time T1, the storage device 1 is powered on.

When the predetermined time has elapsed since the time T1 without reception of the initialization signal, the control unit 2 of the storage device 1 sets the communication port CP2 to the power-saving state at time T2.

After that, it is assumed that at time T3, an external device is newly connected to the communication port CP2, and the external device connected to the communication port CP2 is powered on.

Then, the communication port CP2 receives an initialization signal S1 from the external device connected to the communication port CP2, and transmits an initialization signal S2 to the external device connected to the communication port CP2 as a response to the initialization signal S1.

In the above-described present embodiment, if an initialization signal of a communication channel has not been received at a communication port within a predetermined time since the power was turned on, the control unit 2 may determine that an external device is not connected to the communication port, or that an external device connected to the communication port is not powered on, and set the communication port in a power-saving state. In addition, in the present embodiment, if an initialization signal has been received at a communication port in the power-saving state, the control unit 2 may cause the communication port to transition to a power-normal state.

According to the present embodiment, power consumption of the storage device 1 can be reduced.

Hereinafter, a communication device of a comparative example and the storage device 1 according to the present embodiment will be described.

Figure 4:
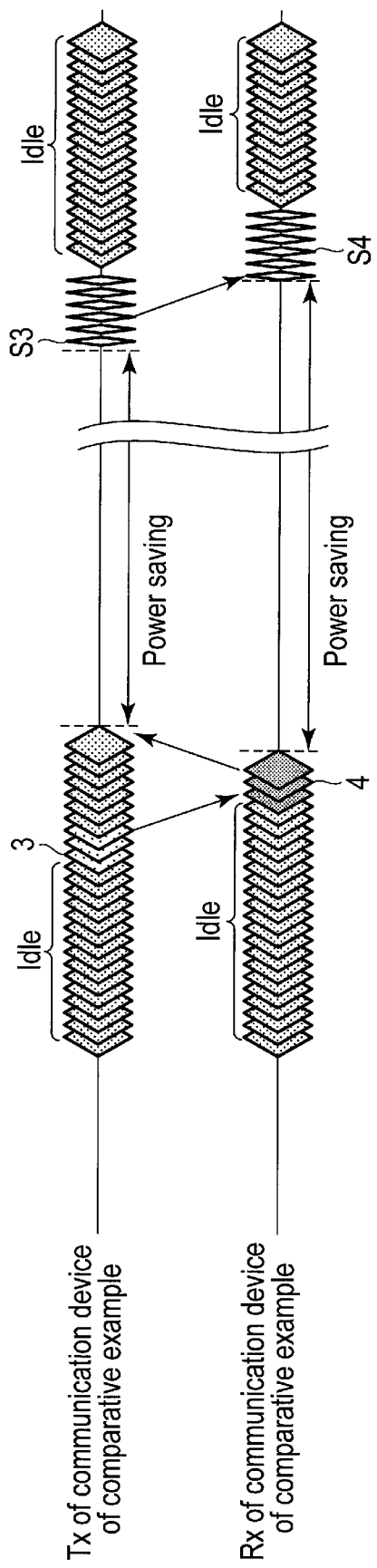
FIG. 4 is a timing chart illustrating a first operation of a communication device according to a comparative example.

FIG. 4 is a timing chart illustrating the first operation of the communication device according to the comparative example.

To set communication ports in a power-saving state in the communication device of the comparative example, an initialization sequence of a communication channel is first executed, and the synchronization of the communication channel (a transmission line Tx and a reception line Rx) between the communication device of the comparative example and an external device to the communication device is acquired. The communication ports thereby enter an idle state. Next, a power-saving request 3 is transmitted from one device to the other device of the communication device and the external device, and a response (power save acknowledgement) 4 to permit power saving is transmitted from the other device to the one device. Then, the communication port of the communication device and the communication port of the external device enter the power-saving state, and power consumption of a transmission circuit and a reception circuit is reduced. The return from the power-saving state is achieved by transmitting a return request signal S3 from one device which wants to return to the other device, and transmitting a return request signal S4 as a response to the return request signal S3.

FIG. 5 is a timing chart illustrating the second operation of the communication device according to the comparative example.

At time T4, the communication device of the comparative example is powered on. After the power is turned on, the communication device of the comparative example periodically transmits an initialization signal S5 of the communication channel from the communication port to start an initialization sequence of the communication channel. Here, at a time T5, the communication device of the comparative example and the external device are connected, and the external device is powered on. Then, the external device transmits a response signal S6 to the initialization signal S5 to the communication device of the comparative example, and the communication device of the comparative example receives the response signal S6 from the external device. The communication port of the communication device of the comparative example and the communication port of the external device thereby acquire synchronization of the communication channel by exchanging synchronization data (for example, speed negotiation dword), and enter an idle state in which they can communicate with each other when synchronization is acquired.

FIG. 6 is a timing chart illustrating the operation of the communication device of another comparative example including a plurality of communication ports.

The communication device of the comparative example including communication ports may execute commands for the communication ports in parallel.

Although the communication device of the comparative example includes four communication ports in FIG. 6, the number of communication ports in the communication device may be any number greater than or equal to two.

The first communication port of the communication device of the comparative example includes a transmission line Tx100 and a reception line Rx100. The second communication port includes a transmission line Tx101 and a reception line Rx101. The third communication port includes a transmission line Tx102 and a reception line Rx102. The fourth communication port includes a transmission line Tx103 and a reception line Rx103.

In FIG. 6, the communication device of the comparative example is powered on at time T6. At time T7, an external device connected to the second communication port is powered on. At time T8, an external device connected to the first communication port is powered on.

Sometimes, it may be hard to estimate to which communication port the external device will be connected. To determine which communication port is connected to the external device, after the communication device is powered on, the communication device periodically transmits initialization signals S5 of communication channels from all the communication ports.

In addition, the communication device of the comparative example cannot set the communication ports to the power-saving state unless the communication device of the comparative example initializes the communication channels and synchronizes with an external device. Thus, a communication port to which no external device is connected cannot enter the power-saving state, and power consumption of the communication device may not be properly reduced.

On the other hand, in the storage device 1 according to the present embodiment, a communication port can be set in the power-saving state even in an asynchronous state with an external device before the initialization sequence of a communication channel is executed. It is therefore unnecessary to periodically transmit an initialization signal from communication ports, and even a communication port to which no external device is connected can be set in the power-saving state.

As a result, according to the present embodiment, power consumption of the storage device 1 can be reduced.

In the above-described present embodiment, if an initialization signal of a communication channel has not been received at a communication port within a predetermined time since the storage device 1 was powered on, the control unit 2 sets the communication port to a power-saving state. Alternatively, the control unit 2 may set the communication port in the power-saving state when the storage device 1 is powered on, without waiting for the predetermined time after the power is turned on.

In the present embodiment, the control unit 2 can control each of the communication ports CP0 to CP3 independently. For example, the first communication port may be synchronous with the corresponding first external device and be in a power-normal state, and the second communication port may be asynchronous with the corresponding second external device and be in the power-saving state. Even in this case, the second communication port transitions from the power-saving state to the power-normal state on the basis of a specific signal, and synchronizes with the second external device.

Second Embodiment

In a second embodiment, a control unit is separated into circuit blocks, and a storage device which controls power supply for each of the circuit blocks will be described.

FIG. 7 is a block diagram of a storage device according to the present embodiment.

In FIG. 7, a controller 5 of the storage device 1 is generated as, for example, large-scale integration (LSI). The controller 5 includes communication ports CP0 to CP3, a control unit 2, a main power supply 6, and power supply circuits PC0 to PC4. Further, in FIG. 7, the control unit 2 includes the communication ports CP0 to CP3 as an example. Alternatively, as illustrated in FIG. 1, the control unit 2 and the communication ports CP0 to CP3 may also be separated in structure.

The main power supply 6 supplies power to each of the power supply circuits PC0 to PC4.

In the present embodiment, the controller 5 is separated into circuit blocks CB0 to CB4 depending on the function.

The power supply circuits PC0 to PC4 are provided to the circuit blocks CB0 to CB4, respectively. The power supply circuits PC0 to PC4 stop power supply to the corresponding circuit blocks CB0 to CB4, if the corresponding circuit blocks CB0 to CB4 are not used. In addition, the power supply circuits PC0 to PC4 resume power supply to the corresponding circuit blocks CB0 to CB4, if the corresponding circuit blocks CB0 to CB4 are used.

In the present embodiment, for example, the communication ports CP0 to CP3 are included in the circuit blocks CB0 to CB3, respectively. If any of the communication ports CP0 to CP3 are in a power-saving state, the power supply circuits PC0 to PC3 shut off power supply to the circuit blocks CB0 to CB3 including the communication ports CP0 to CP3 which are in the power-saving state.

Power consumption of the storage device 1 can be thereby reduced more efficiently.

Third Embodiment

In a third embodiment, a storage device causes a communication port to transition to a power-normal state after a predetermined time has elapsed since the communication port entered a power-saving state.

Figure 8:
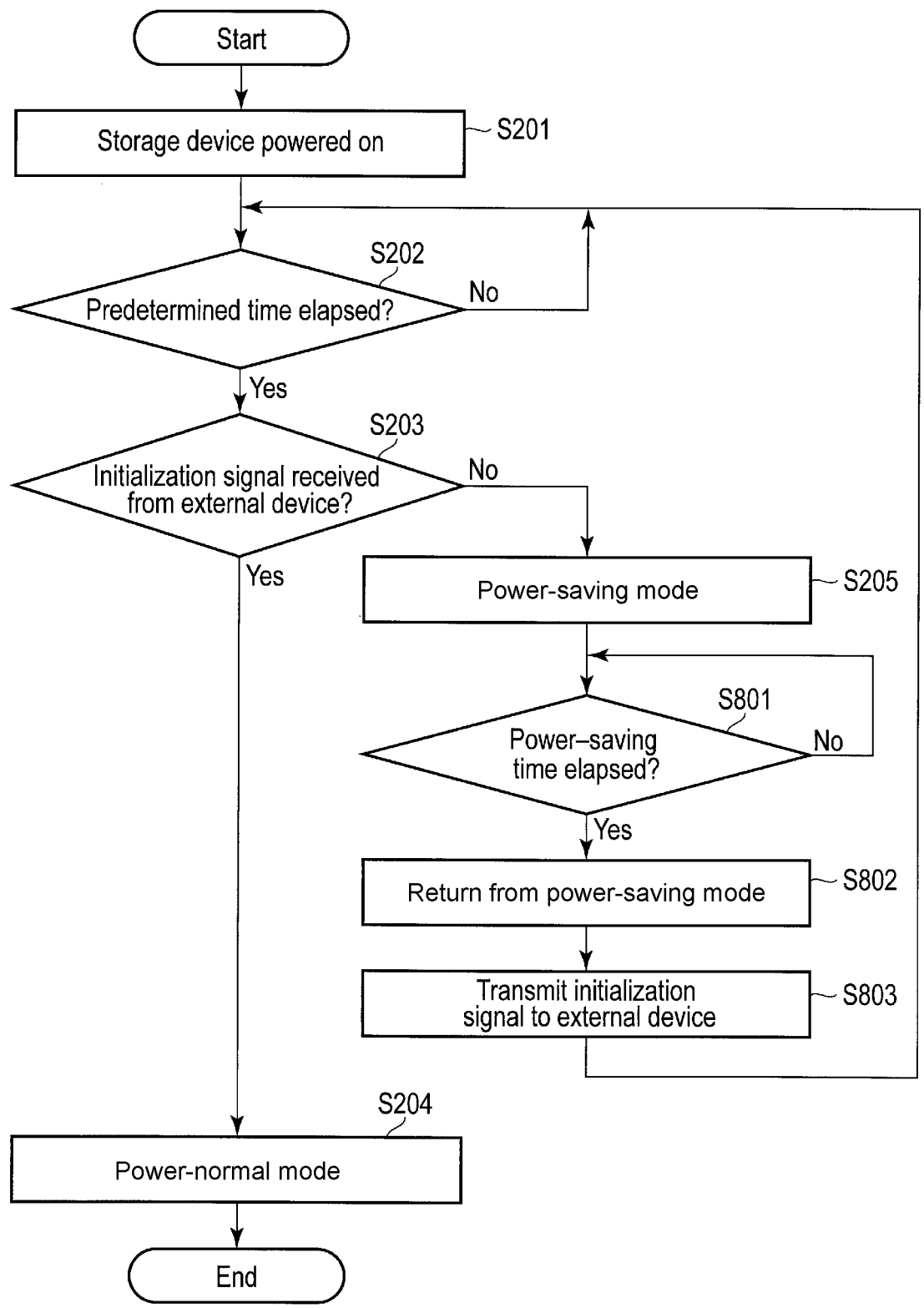
FIG. 8 is a flowchart illustrating processing of a storage device according to a third embodiment.

FIG. 8 is a flowchart illustrating the processing of the storage device 1 according to the present embodiment. FIG. 8 differs from FIG. 2 in the processing after step S205.

After a communication port enters the power-saving state, a determiner 22 determines whether or not a predetermined power-saving time has elapsed in step S801. The communication port is in a wait state until the power-saving time has elapsed.

When the power-saving time has elapsed since the communication port entered the power-saving state, a setting unit 23 causes the communication port to return from the power-saving state to the power-normal state in step S802, and transmits an initialization signal in step S803. Then, the processing returns to step S202.

FIG. 9 is a timing chart illustrating the operation of the storage device 1 according to the present embodiment. FIG. 9 illustrates the communication state of signals between a transmission line Tx0 and a reception line Rx0 of a communication port CP0 of the storage device 1. Because the communication ports CP1 to CP3 are the same as the communication port CP0, description thereof is omitted.

At time T9, the storage device 1 is powered on. At time T10, i.e., when a predetermined time has elapsed, the communication port CP0 enters the power-saving state.

At time T11, i.e., when the power-saving time has elapsed, the communication port CP0 returns from the power-saving state and transmits an initialization signal S7.

When a predetermined time has elapsed since the initialization signal S7 was transmitted, the communication port enters the power-saving state at time T12.

At time T13, i.e., when the power-saving time has elapsed, the communication port CP0 returns from the power-saving state, and transmits an initialization signal S7.

In the present embodiment, the communication ports CP0 to CP3 of the storage device 1 return from the power-saving state once and transmit initialization signals when the power-saving time has elapsed since the communication ports CP0 to CP3 entered the power-saving state, and enter the power-saving state again when a predetermined time has elapsed.

According to the present embodiment, the storage device 1 and an external device enter a state of waiting for an initialization signal, whereby the occurrence of a deadlock can be prevented. Here, deadlock is a situation in which both the storage device 1 and the external device are in the power-saving state, do not transmit the initialization signal, and wait for the initialization signal being transmitted from the other device.

Various operations of the storage device 1 according to one or more of the above-described embodiments may be implemented by executing a program on a computer. For example, the computer loads a program stored in a non-transitory or nonvolatile storage medium, and executes the program.

The communication function, and the transition function between the power-saving state and the power-normal state of the storage device 1 according to one or more of the embodiments may be provided in a communication device that is communicable with the external device.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device, comprising:
a communication port configured to perform serial communication with an external device; and
a controller configured to set the communication port to a power-saving mode before the communication port receives a signal for synchronization from the external device after power-on of the electronic device.

2. The electronic device according to claim 1, wherein the controller is configured to set the communication port to the power-saving mode when the communication port receives no signal for synchronization for a first period of time.

3. The electronic device according to claim 2, wherein the first period of time starts when the electronic device is powered on and when the controller detects a non-synchronization state, in which state the communication port is not synchronized with any external device.

4. The electronic device according to claim 1, wherein the controller is further configured to recover the communication port from the power-saving mode and transmit a signal for synchronization through the communication port, in a case where the communication port is in the power-saving mode for more than a second period of time.

5. The electronic device according to claim 4, wherein the controller is further configured to set the communication port to the power-saving mode again, in a case where the communication port receives no signal for synchronization for more than a third period of time after transmitting the signal for synchronization.

6. The electronic device according to claim 1, wherein the serial communication conforms to Serial Attached SCSI (SAS) protocol, and
the power-saving mode includes one of a partial power mode and a slumber power mode of the SAS protocol.

7. The electronic device according to claim 6, wherein the signal for synchronization is COMINIT of the SAS protocol.

8. The electronic device according to claim 1, wherein the electronic device is a storage device.

9. An electronic device, comprising:
a communication port configured to perform serial communication with an external device; and
a controller configured to set the communication port to a power-saving mode in a case where the communication port is in an asynchronous state with the external device and the communication port receives no signal for synchronization from the external device for more than a first period of time.

10. The electronic device according to claim 9, wherein the controller is further configured to recover the communication port from the power-saving mode and transmit a signal for synchronization through the communication port, in a case where the communication port is in the power-saving mode for more than a second period of time.

11. The electronic device according to claim 10, wherein the controller is further configured to set the communication port to the power-saving mode again, in a case where the communication port receives no signal for synchronization for more than a third period of time after transmitting the signal for synchronization.

12. The electronic device according to claim 9, wherein the serial communication conforms to Serial Attached SCSI (SAS) protocol, and
the power-saving mode includes one of a partial power mode and a slumber power mode of the SAS protocol.

13. The electronic device according to claim 12, wherein the signal for synchronization is COMINIT of the SAS protocol.

14. The electronic device according to claim 9, wherein the electronic device is a storage device.

15. An electronic device, comprising:
a communication port configured to perform serial communication with an external device; and
a controller configured to:
   not transmit a signal for synchronization from the communication port and set the communication port to a power-saving mode, in a case where no external device is connected with the communication port for more than a first period of time, and
   recover the communication port from the power-saving mode and transmit a signal for synchronization through the communication port, in a case where the communication port is in the power-saving mode for more than a second period of time.

16. The electronic device according to claim 15, wherein the controller is further configured to set the communication port to the power-saving mode again, in a case where the communication port receives no signal for synchronization for more than a third period of time after transmitting the signal for synchronization.

17. The electronic device according to claim 15, wherein the serial communication conforms to Serial Attached SCSI (SAS) protocol, and
the power-saving mode includes one of a partial power mode and a slumber power mode of the SAS protocol.

18. The electronic device according to claim 17, wherein the signal for synchronization is COMINIT of the SAS protocol.

19. The electronic device according to claim 15, wherein the electronic device is a storage device.

* * * * *